(12) United States Patent
Rodgers et al.

(10) Patent No.: US 7,105,117 B2
(45) Date of Patent: Sep. 12, 2006

(54) MANUFACTURING METHOD FOR INCREASING THERMAL AND ELECTRICAL CONDUCTIVITIES OF POLYMERS

(75) Inventors: William R. Rodgers, Sterling Heights, MI (US); Robert A. Ottaviani, Anthem, AZ (US)

(73) Assignee: General Motors Corporation, Detroit, MI (US)

( * ) Notice: Subject to any disclaimer, the term of this patent is extended or adjusted under 35 U.S.C. 154(b) by 374 days.

(21) Appl. No.: 10/337,254

(22) Filed: Jan. 6, 2003

(65) Prior Publication Data

US 2004/0131823 A1    Jul. 8, 2004

(51) Int. Cl.
*B29C 47/06* (2006.01)

(52) U.S. Cl. ............ 264/173.12; 264/105; 264/173.11; 264/211

(58) Field of Classification Search ............... None
See application file for complete search history.

(56) References Cited

U.S. PATENT DOCUMENTS

| | | | | |
|---|---|---|---|---|
| 3,773,882 A * | 11/1973 | Schrenk | ............... | 264/173.12 |
| 5,902,518 A | 5/1999 | Khazai et al. | ............... | 252/511 |
| 6,068,933 A | 5/2000 | Shepard et al. | ............... | 428/474.4 |
| 6,599,446 B1 * | 7/2003 | Todt et al. | ............... | 252/511 |
| 6,808,658 B1 * | 10/2004 | Stover | ............... | 264/1.6 |
| 6,830,713 B1 * | 12/2004 | Hebrink et al. | ............... | 264/1.6 |
| 2001/0011779 A1 * | 8/2001 | Stover | ............... | 264/1.7 |
| 2001/0013668 A1 * | 8/2001 | Neavin et al. | ............... | 264/1.7 |
| 2002/0135103 A1 * | 9/2002 | Odorzynski et al. | ............... | 264/442 |
| 2003/0055198 A1 * | 3/2003 | Langer et al. | ............... | 528/80 |
| 2004/0088835 A1 * | 5/2004 | Tachauer et al. | ............... | 24/451 |
| 2004/0089412 A1 * | 5/2004 | Topolkaraev | ............... | 156/250 |
| 2005/0060849 A1 * | 3/2005 | Vanbenschoten et al. | ............... | 24/451 |
| 2005/0175827 A1 * | 8/2005 | Hebrink et al. | ............... | 428/212 |

FOREIGN PATENT DOCUMENTS

WO    WO01/21688    3/2001

OTHER PUBLICATIONS

D. Jarus et al., "Barrier properties of polypropylene/polyamide blends produced by microlayer coextrusion", Polymer, 43, (2002) 2401-2408.

* cited by examiner

*Primary Examiner*—Mark Eashoo
(74) *Attorney, Agent, or Firm*—Kathryn A. Marra

(57) ABSTRACT

A method of manufacturing to increase the thermal and electrical conductivity of polymers includes layering a filled polymer with an unfilled polymer to produce a multi-layered system of alternating filled and unfilled polymer layers. The filler material comprises thermally and/or electrically conductive material. A preferred polymer is a shape memory polymer. A method of manufacturing magnetic multi-layered polymer systems is described. Articles formed from such multi-layered systems are also disclosed.

10 Claims, 3 Drawing Sheets

MANUFACTURING METHOD FOR INCREASING THERMAL AND ELECTRICAL CONDUCTIVITIES OF POLYMERS

BACKGROUND

This disclosure relates to a method for increasing thermal and/or electrical conductivity of polymers through a multi-layering process, and more specifically for increasing thermal and/or electrical conductivity of shape memory polymers.

Shape memory polymers (SMP) are known in the art and generally refer to a group of polymeric materials that demonstrate the ability to return to some previously defined shape when subjected to an appropriate thermal stimulus. Shape memory polymers are capable of undergoing phase transitions in which their shape orientation is altered as a function of temperature. Generally, SMP have two main segments, a hard segment and a soft segment. The previously defined or permanent shape can be set by melting or processing the polymer at a temperature higher than the highest thermal transition followed by cooling below that thermal transition temperature. The highest thermal transition is usually the glass transition temperature (Tg) or melting point of the hard segment. A temporary shape can be set by heating the material to a temperature higher than the Tg or the transition temperature of the soft segment, but lower than the Tg or melting point of the hard segment. The temporary shape is set while processing the material at the transition temperature of the soft segment followed by cooling to fix the shape. The material can be reverted back to the permanent shape by heating the material above the transition temperature of the soft segment. Shape recovery can be set at any temperature between −63° C. and 120° C. or above. By changing the structure and composition of the polymer, the transition temperatures and mechanical properties of the SMP can be optimized for a particular application.

Addition of thermally and/or electrically conductive fillers to polymer matrices is known. The conductive fillers may be particulate or fibrous, and may be made from a variety of materials such as metals, metal alloys, and conductive carbon black. Generally, unfilled polymers are electrical and thermal insulators. By adding conductive fillers, heat dissipation can be improved by increasing the thermal conductivity of the blend. Addition of electrically conductive fillers allows conducting paths through the polymer blend, thereby lowering the resistivity of the polymer.

Microlayer extrusion to form multilayered components is known. For example, WO 01/21688 to Pulford et al. generally discloses the use of a duplex extruder with multilayering dies to produce a multilayered rubber component.

BRIEF SUMMARY

Disclosed herein is a method of producing a multi-layered shape memory polymer system, comprising layering a first shape memory polymer with a second shape memory polymer in alternating layers, wherein the first shape memory polymer comprises an electrically and/or thermally conductive filler.

In a second embodiment, a method of producing a multi-layered magnetic polymer system comprises layering a first polymer with a second polymer in alternating layers to form a multi-layered system, wherein the first polymer comprises a magnetic filler; extruding the multi-layered system; and applying a magnetic field to the extruded multi-layered system to induce the poles of the magnetic filler to align prior to cooling or cross-linking of the polymer.

Articles formed from the multi-layered systems are also described.

The above described and other features are exemplified by the following figures and detailed description.

BRIEF DESCRIPTION OF THE DRAWINGS

Referring now to the figures, which are exemplary embodiments and wherein the like elements are numbered alike.

DETAILED DESCRIPTION

Figure 1:
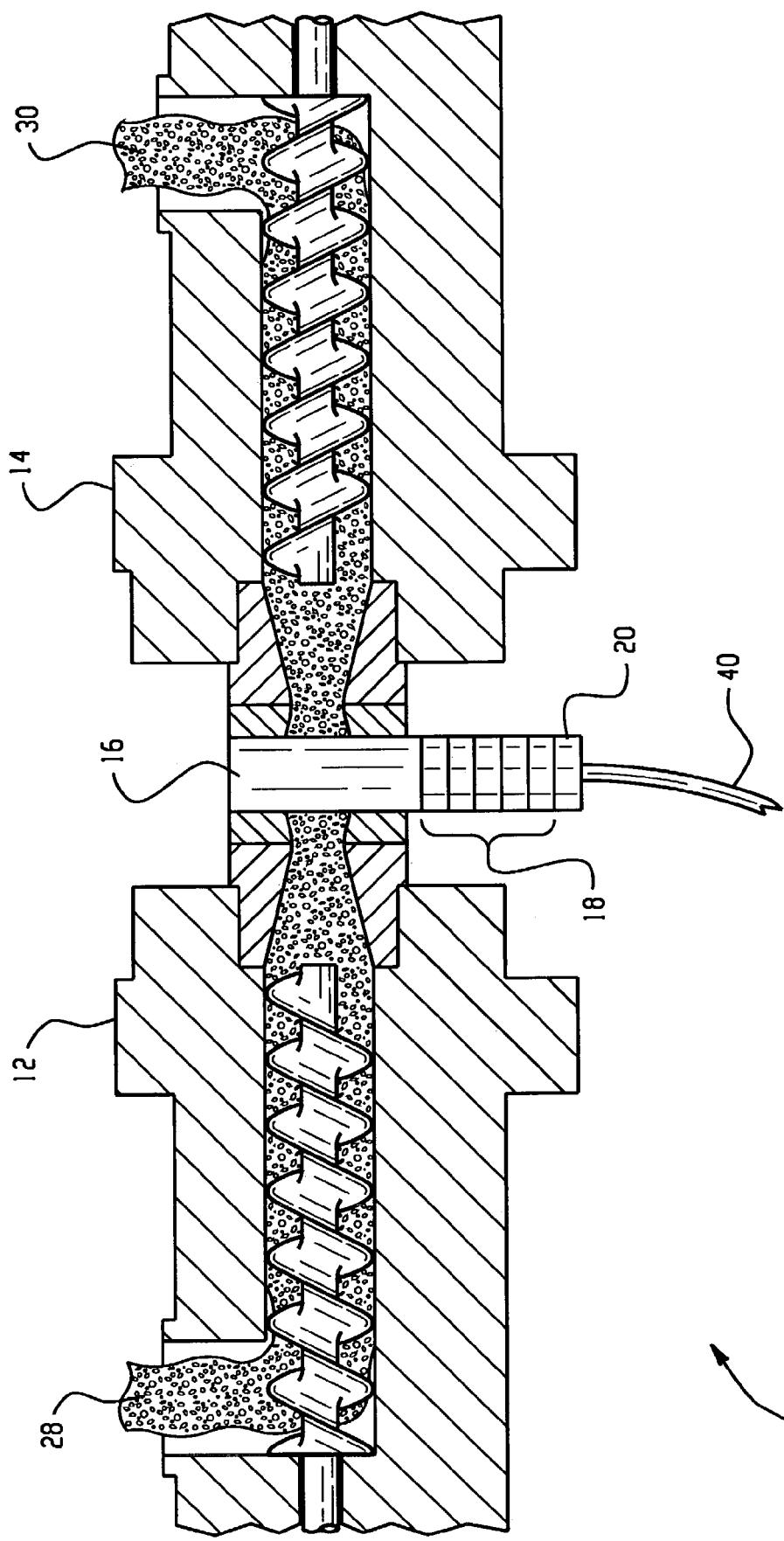
FIG. 1 is a schematic of a duplex extruder equipped with microlayering die inserts.
Figure 2:
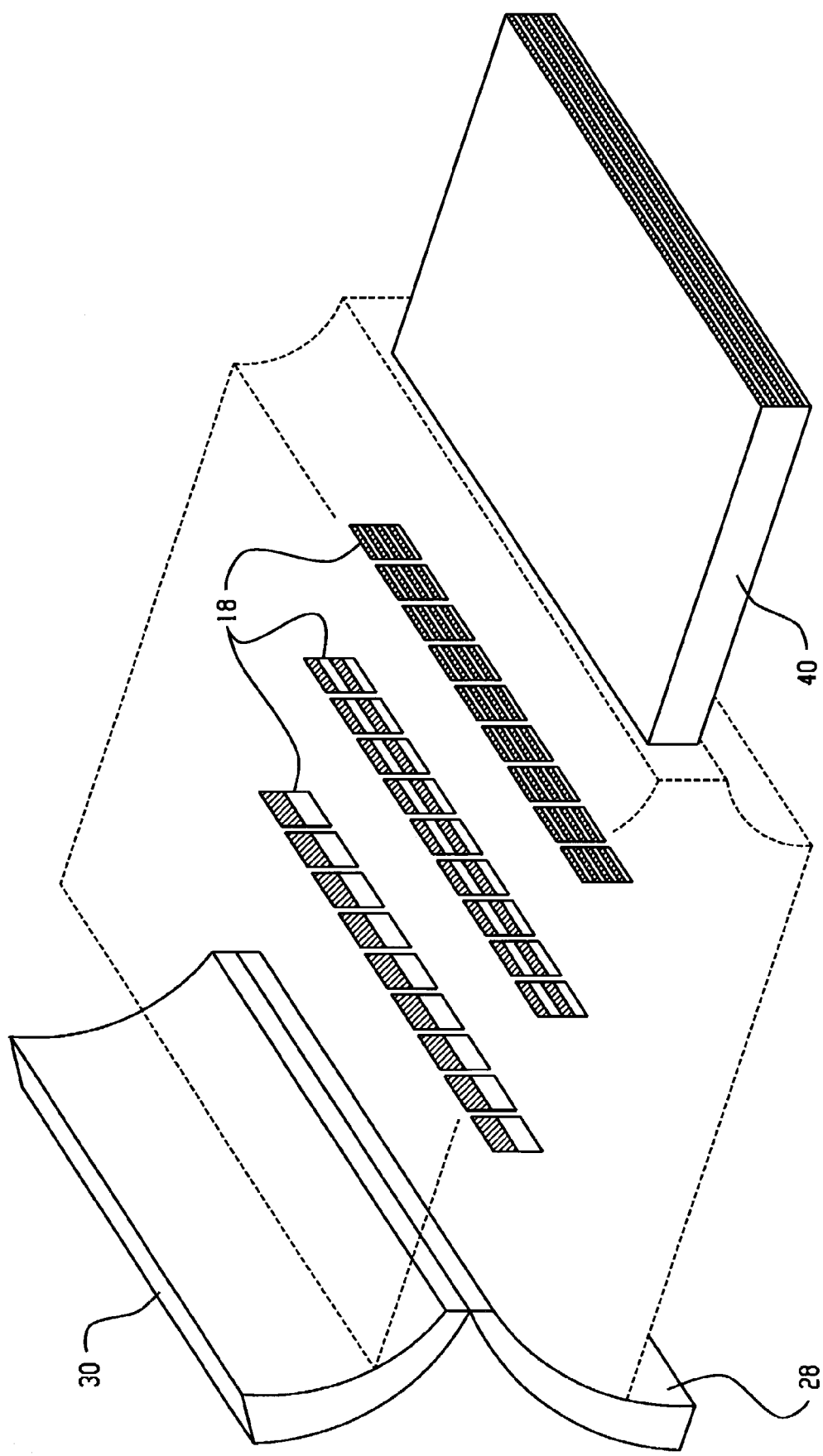
FIG. 2 is a schematic of a close-up of the micro-layering die inserts and the multi-layered polymer system.

As shown in FIG. 1, a duplex extruder, generally indicated as 10, comprises a first extruder 12 and a second extruder 14. An unfilled polymer 28 is fed through the first extruder 12 and a filled polymer 30 is fed through the second extruder 14. The unfilled and filled polymers 28, 30 are formed into a bilayer in the extruder die 16. The bilayer is then fed through a series of multi-layering die inserts 18, each of which doubles the number of layers in the extrudate, and then through a shaping die 20. FIG. 2 shows a schematic of the polymer bilayer passing through the multi-layering die inserts 18 to form a multi-layered system 40. The resulting multi-layered system 40 comprises alternating layers of filled and unfilled polymer layers. The filler enhances the thermal and/or electrical conductivities of the resulting multi-layered system, which allows for faster heating and cooling of the system. Filled polymer could also be used in both extruders. In this case, the multilayer extrusion would assist with the alignment of filler particles within the layers. The illustrated duplex extruder system is exemplary only and is not intended to be limited to any particular first 12 and second 14 extruder shape, size, configuration, number of multi-layering die inserts 18, type of shaping die 20, number of layers in the multilayered system, or the like. Terms to "first" and "second" are only identifiers and are not intended to illustrate a position, sequence, order, etc.

Suitable extruders for use in the duplex extruder system 10 for the first and second extruders 12, 14 are of any construction that allows preparation of the particular polymers in the melt state. Examples of suitable extruders include single screw, twin-screw, multi-screw, oscillating single screw, and the like. The size, speed of rotation, temperature, and the like, of the extruders are to be chosen based on the polymer and/or polymer blends used for the multi-layered system and are well known to those in the art.

The number of multi-layering dies 18 determines the number of layers in the multi-layered system. Multi-layering dies can be microlayering dies. The number of alternating layers of filled and unfilled polymer is dependent upon the application of the resulting multi-layered system. The thickness of the individual layers that make up the multi-layered system is dependent upon the polymer used and the type of filler employed. A preferred thickness of each layer in the multi-layered system is greater than or equal to about 0.001 millimeter, preferably greater than or equal to about 0.01 millimeter, and more preferably greater than or equal to about 0.1 millimeter. Also preferred is a layer thickness of less than or equal to about 5.0 millimeters, more preferably less than or equal to about 2.0 millimeters, and most preferably less than or equal to about 1.0 millimeter.

In one embodiment, the particular polymer for the unfilled 28 and filled 30 polymers is preferably a shape memory polymer. To set the permanent shape of the SMP, the polymer must be at about or above the Tg or melting point of the hard segment of the polymer. "Segment" refers to a block or sequence of polymer forming part of the SMP. The SMP is shaped at this temperature with an applied force followed by cooling to set the permanent shape. The temperature necessary to set the permanent shape is between about 100° C. to about 300° C. Setting the temporary shape of the SMP requires the SMP material to be brought to a temperature at or above the Tg or transition temperature of the soft segment, but below the Tg or melting point of the hard segment. At the soft segment transition temperature (also termed "first transition temperature"), the temporary shape of the SMP is set followed by cooling of the SMP to lock in the temporary shape. The temporary shape is maintained as long as the SMP remains below the soft segment transition temperature. The permanent shape is regained when the SMP is once again brought to or above the transition temperature of the soft segment. The temporary shape can be reset by repeating the heating, shaping and cooling steps. The soft segment transition temperature can be chosen for a particular application by modifying the structure and composition of the polymer. Transition temperatures of the soft segment range from about −63° C. to above about 120° C.

Shape memory polymers may contain more than two transition temperatures. A SMP composition comprising a hard segment and two soft segments can have three transition temperatures: the highest transition temperature for the hard segment and two transition temperatures for each soft segment. The presence of the second soft segment allows for the SMP composition to exhibit two permanent shapes.

Shape memory polymers can be thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof Examples of suitable polyacrylates include poly(methyl methacrylate), poly(ethyl methacrylate), poly(butyl methacrylate), poly (isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether), ethylene vinyl acetate, polyethylene, poly(ethylene oxide)-poly (ethylene terephthalate), polyethylene/nylon (graft copolymer), polycaprolactones-polyamide (block copolymer), poly (caprolactone)dimethacrylate-n-butyl acrylate, poly (norbornyl-polyhedral oligomeric silsequioxane), polyvinylchloride, urethane/butadiene copolymers, polyurethane block copolymers, styrene-butadiene-styrene block copolymers, and the like.

In a preferred embodiment, the polymer used for the unfilled 28 and the filled 30 polymer comprise the same shape memory polymer.

Fillers for use in the filled polymer 30 are preferably fillers possessing high thermal and/or electrical conductivity. Suitable fillers include particles, powders, flakes, or fibers of metal, metal oxide, metal alloy, and/or conductive carbon as well as glass, ceramic, or graphite fibers coated with metal or metal alloys. Suitable fibrous fillers include fibers fabricated from copper, silver, aluminum, nickel, carbon, graphite, magnesium, chromium, tin, iron, titanium, and mixtures comprising at least one of the foregoing metals. Also suitable are fibers fabricated from alloys of iron such as stainless steel, nickel alloys, and copper alloys. Metal-coated fibers having cores of varying materials are also useful. Suitable core materials for the metal-coated fiber may include vitreous mineral such as glass, silicates of aluminum, silicates of magnesium, silicates of calcium, and the like; and inorganic carbon materials such as graphite, carbon fibers, mica, and the like. Suitable particulate materials include powders or particles of carbon, iron, aluminum, copper, magnesium, chromium, tin, nickel, silver, iron, titanium, stainless steel, and mixtures comprising at least one of the foregoing.

Fibers, powders, and flakes may be distinguished from each other on the basis of their aspect ratios. Fibers may be defined as having a number average aspect ratio greater than about 4, wherein the aspect ratio is defined as the ratio of the length to the equivalent circular diameter. In contrast, flakes may be defined as having a number average aspect ratio less than about 0.25, and powders may be defined as having a number average aspect ratio of about 0.25 to about 4.

The thermal and electrical resistivity values of the multi-layered system depend upon the type and amount of filler in the polymer matrices. The multilayered system can have a thermal conductivity of greater than or equal to about 0.1 watt per meter Kelvin (W/mK), preferably greater than or equal to about 0.5 W/mK, and more preferably greater than or equal to about 1 W/mK. Also, the multi-layered system can have a thermal conductivity of less than or equal to about 30 W/mK, preferably less than or equal to about 20 W/mK, and more preferably less than or equal to about 10 W/mK. The multi-layered system can have an electrical conductivity of greater than or equal to about $10^{-4}$ ohm-centimeter (ohm-cm), preferably greater than or equal to about $10^{-3}$ ohm-cm, and more preferably greater than or equal to about $10^{-2}$ ohm-cm. Also, the multi-layered system can have an electrical conductivity of less than or equal to about $10^2$ ohm-cm, preferably less than or equal to about 10 ohm-cm, and more preferably less than or equal to about 1 ohm-cm.

A suitable amount of filler is greater than or equal to about 1 weight percent, preferably greater than or equal to about 2 weight percent, and more preferably greater than or equal to about 5 weight percent based on the total weight of filled polymer 30. Also preferred is a filler amount of less than or equal to about 70 weight percent, more preferably less than or equal to about 60 weight percent, and most preferably less than or equal to about 50 weight percent based on the total weight of the filled polymer 30. The filler in the filled polymer 30 is preferably uniformly distributed in the polymer matrix.

In one embodiment the filled polymer comprises more than one type of filler.

The incorporation of conductive fillers in a SMP increases the rate of shape change by quickly distributing heat throughout the polymer matrix. The multi-layered system comprising electrically conductive filler can be heated resistively through the filler itself. The multi-layered system or articles made therefrom can be heated thermally, optically, resistively, by induction, or by high frequency.

Figure 3:
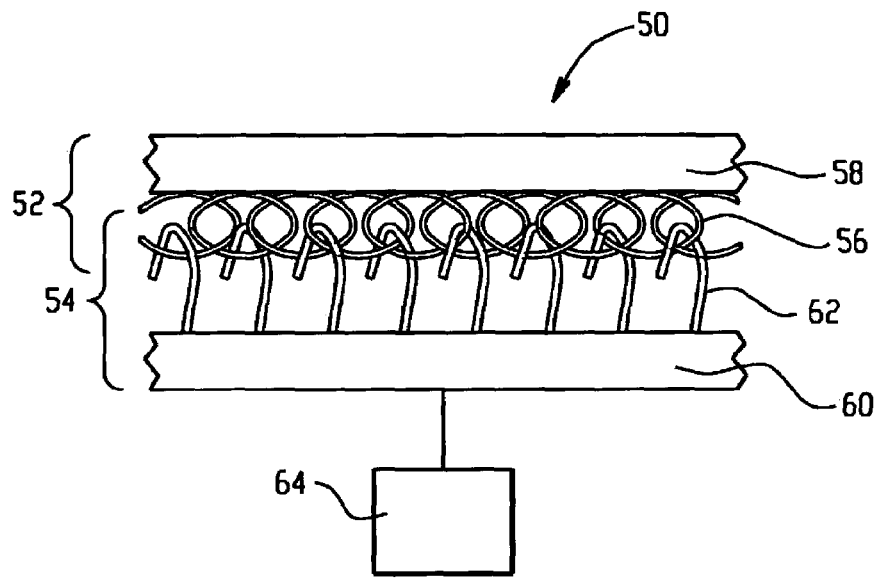
FIG. 3 is a cross sectional view of the releasable fastening system of FIG. 1, wherein the releasable fastening system is engaged.
Figure 4:
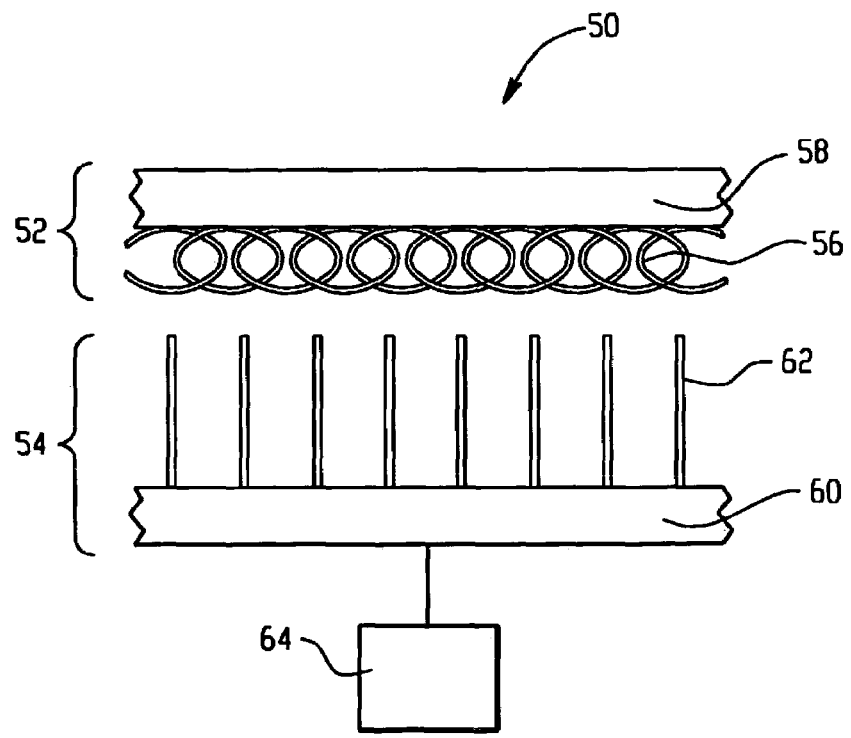
FIG. 4 is a cross sectional view of the releasable fastening system of FIG. 1, wherein the releasable fastening system is disengaged.

The multi-layered system may be formed into articles or structures of any geometry such as rods, wires, sheets, hooks, fibers, tubes, spheres, pellets, and the like. An especially preferred article is a hook suitable for use in a hook and loop releasable fastener system 50, as shown in FIGS. 3 and 4. The hooks can have an inverted J-shaped orientation, a mushroom shape, a knob shape, a multi-tined anchor, T-shape, L-shapes, U-shapes, spirals, or any other mechanical form of a hook-like element used for separable hook and loop fasteners. Such elements are referred to herein as "hook-like", "hook-type", or "hook" elements whether or not they are in the shape of a hook.

During engagement of the hook and loop fastener system 50, a loop portion 52 and a hook portion 54 are pressed together to create a joint that is relatively strong in shear and/or pull-off directions, and weak in a peel direction. The loop portion 52 includes a loop material 56 disposed onto a support 58. The hook portion 54 includes the multi-layered hook elements 62 attached to the support 60.

During disengagement, an activation signal is provided to the hook elements 62 from an activation device 64 coupled thereto. The activation signal reduces the shear and pull-off forces resulting from the engagement by altering the shape orientation and/or flexural modulus of the hook elements 62 to provide a remote releasing mechanism of the engaged joint. That is, the change in shape orientation and/or flexural modulus of the hook elements 62 reduces the shearing forces in the plane of engagement, and/or reduces the pull off forces perpendicular to the plane of engagement. However, depending on the hook geometry and direction of shear, the reduction in pull off forces is generally expected to be greater than the reduction in shear forces. For example, as shown in FIGS. 3 and 4, the plurality of hook elements 62 can have inverted J-shaped orientations that are changed, upon demand, to substantially straightened shape orientations upon receiving the thermal activation signal from the activation device 64. The substantially straightened shape orientation relative to the J-shaped orientation provides the joint with marked reductions in shear and/or pull-off forces.

Any method of forming articles or structures from the multi-layered system may be used, such as injection molding, tooling, cutting, crimping, machining, and the like.

In a second embodiment, the polymers 28 and 30 may be any type of polymer and the filler, a magnetic filler. Suitable magnetic filler materials include, but are not intended to be limited to, hematite; magnetite; magnetic material based on iron, nickel, and cobalt, alloys of the foregoing, or combinations comprising at least one of the foregoing, and the like. Alloys of iron, nickel and/or cobalt, can comprise aluminum, silicon, cobalt, nickel, vanadium, molybdenum, chromium, tungsten, manganese and/or copper. The filler can be in the form of a fiber, flake, particle, or powder.

A suitable amount of filler in the filled polymer 30 system is greater than or equal to about 20 weight percent, preferably greater than or equal to about 25 weight percent, and more preferably greater than or equal to about 30 weight percent based on the total weight of filled polymer 30. Also preferred is a filler amount of less than or equal to about 70 weight percent, more preferably less than or equal to about 60 weight percent, and most preferably less than or equal to about 50 weight percent based on the total weight of the filled polymer 30.

Suitable polymers for use in the second embodiment include, but are not intended to be limited to, polyamides, polyesters, polyester amides, polyanhydrides, polycarbonates, polyacrylates, polyalkylenes, polyacrylamides, polyalkylene oxides, polyalkylene terephthalates, polyortho esters, polyvinyl ethers, polyvinyl esters, polyvinyl halides, polyethers, polyether amides, polyether esters, poly(arylene ethers), polyurethanes, polysulfones, copolymers thereof, and the like.

In an especially preferred embodiment, during extrusion the magnetic filler material is subjected to a strong magnetic field that aligns the magnetic dipole of the filler prior to cooling and/or cross-linking of the polymer as it flows through or out of the shaping die 20.

Articles can be formed with the magnetic multi-layered polymer system as mentioned previously for the SMP system.

Additionally, the polymers may optionally also include effective amounts of at least one additive selected from the group consisting of anti-oxidants, flame retardants, drip retardants, dyes, pigments, colorants, stabilizers, small particle mineral such as clay, mica, and talc, antistatic agents, plasticizers, lubricants, and mixtures thereof. These additives are known in the art, as are their effective levels and methods of incorporation. Effective amounts of the additives vary widely, but they are usually present in an amount up to about 50% or more by weight, based on the weight of the entire composition.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A method of producing a multi-layered shape memory polymer system, comprising:
   layering a first shape memory polymer with a second shape memory polymer in alternating layers, wherein the alternating layers are not corrugated; and
   wherein the first shape memory polymer and/or the second shape memory polymer comprises an electrically and/or thermally conductive filler in an amount effective to increase the thermal and/or electrical conductivity of the first and/or second shape memory polymers.

2. The method of claim 1, wherein the multi-layered system comprises micro-layers.

3. The method of claim 1, wherein the first shape memory polymer and the second memory polymer comprise the same shape memory polymer.

4. The method of claim 1, wherein the first and second shape memory polymers have a soft segment transition temperature of about −63° C. to about 120° C.

5. The method of claim 1, wherein the filler is a metal, metal oxide, metal alloy, carbon, or mixtures comprising at least one of the foregoing fillers.

6. The method of claim 1, wherein the filler is a powder comprising carbon, iron, iron oxides, iron alloys, aluminum, copper, magnesium, chromium, tin, nickel, silver, titanium, stainless steel, and mixtures comprising at least one of the foregoing fillers.

7. The method of claim 1, wherein the filler is a fiber fabricated from copper, copper alloys, silver, aluminum, nickel, nickel alloys, carbon, graphite, magnesium, chromium, tin, iron, iron alloys, titanium, and mixtures comprising at least one of the foregoing fillers.

8. The method of claim 1, wherein the filler is a fiber comprising a metal-coated fiber core material, wherein the core material is glass, silicates of aluminum, silicates of magnesium, silicates of calcium, graphite, carbon fibers, or mica.

9. The method of claim 1, wherein the first memory polymer comprises two electrically and/or thermally conductive fillers.

10. The method of claim 1, wherein the multi-layered system has a thermal conductivity of about 1 to 20 W/mK and an electrical conductivity of about 0.01 to 1.0 ohm-cm.

* * * * *